United States Patent
Dackefjord (10) Patent No.: US 10,054,664 B2
(45) Date of Patent: Aug. 21, 2018

(54) ENHANCED TIME OF ARRIVAL POSITIONING SYSTEM

(71) Applicant: NIDATECH SWEDEN AB, Malmo (SE)

(72) Inventor: Håkan Dackefjord, Älvsjö (SE)

(73) Assignee: NIDATECH SWEDEN AB, Malmö (SE)

( * ) Notice: Subject to any disclaimer, the term of this patent is extended or adjusted under 35 U.S.C. 154(b) by 0 days.

(21) Appl. No.: 15/384,697

(22) Filed: Dec. 20, 2016

(65) Prior Publication Data
US 2017/0102448 A1    Apr. 13, 2017

Related U.S. Application Data (63) Continuation of application No. PCT/SE2015/050417, filed on Apr. 7, 2015.

(51) Int. Cl.
| | |
|---|---|
| *G01S 5/02* | (2010.01) |
| *H04W 64/00* | (2009.01) |
| *G01S 11/08* | (2006.01) |
| *G01S 11/14* | (2006.01) |

(52) U.S. Cl.
CPC ............ *G01S 5/0263* (2013.01); *G01S 11/08* (2013.01); *G01S 11/14* (2013.01); *H04W 64/00* (2013.01)

(58) Field of Classification Search
CPC . H04L 41/12; H04L 43/0852; H04L 43/0864; H04L 2012/5649; G01S 5/0263; G01S 11/08; G01S 11/14; H04W 64/00
See application file for complete search history.

(56) References Cited

U.S. PATENT DOCUMENTS

| | | | |
|---|---|---|---|
| 6,469,615 B1 | 10/2002 | Kady et al. | |
| 7,636,038 B1* | 12/2009 | Nof | H04W 24/04 |
| | | | 340/506 |
| 2003/0174048 A1 | 9/2003 | McCorkle | |
| 2010/0172339 A1* | 7/2010 | Duan | G01S 13/765 |
| | | | 370/350 |
| 2010/0278060 A1 | 11/2010 | Lee et al. | |
| 2011/0128846 A1* | 6/2011 | Hong | H04W 28/18 |
| | | | 370/230 |
| 2011/0228749 A1* | 9/2011 | Taghavi Nasrabadi | H04L 12/5692 |
| | | | 370/338 |
| 2011/0242522 A1* | 10/2011 | Etkin | H04L 41/12 |
| | | | 356/5.01 |

(Continued)

FOREIGN PATENT DOCUMENTS

| | | |
|---|---|---|
| JP | 2007141094 A | 6/2007 |
| WO | 2006021047 A1 | 3/2006 |

(Continued)

*Primary Examiner* — Nizar Sivji
(74) *Attorney, Agent, or Firm* — Gabriela B. Tomescu, Esq.; Bergenstråhle & Partners AB (57) ABSTRACT

Method, node, computer program, and computer program product in a wireless communication network, comprising a network communication unit with a medium access control layer (MAC-Layer), said node configured to calculate the Time of Arrival and/or Time of Flight based on a counted time from transmission of a response request message in the medium access control layer of said node to the corresponding arrival of a response to said response request message in the medium access control layer (MAC-Layer) of said node.

17 Claims, 10 Drawing Sheets

(56) References Cited

U.S. PATENT DOCUMENTS

2013/0154802 A1* 6/2013 O'Haire ................ G01S 13/751
                                                        340/10.1
2013/0176107 A1   7/2013 Dumas et al.
2016/0174040 A1* 6/2016 Roberts ................ H04W 4/025
                                                        455/456.1

FOREIGN PATENT DOCUMENTS

| WO | 2009045018 A1 | 4/2009 |
| WO | 2009082728 A2 | 7/2009 |
| WO | 2014011381 A1 | 1/2014 |
| WO | 2014098760 A1 | 6/2014 |

* cited by examiner

ENHANCED TIME OF ARRIVAL POSITIONING SYSTEM

This application is the continuation of International Application No. PCT/SE2015/050417, filed 7 Apr. 2015, the entire contents of which are hereby incorporated by reference.

TECHNICAL FIELD

The present solution relates generally to an enhanced Time of Arrival/Time of Flight distance determination system used with wireless communication networks.

BACKGROUND ART

Localization of nodes e.g. mobile devices in wireless communication networks, such as for instance Wi-Fi standards under 802.11x, Bluetooth, Zigbee standards under 802.15x, or any other suitable wireless communication network, has previously been based on so-called round trip time (RTT) measurements for receiving distance information between nodes. However, estimation of RTT of signals sent between nodes in the wireless networks for distance estimations has relevant drawbacks. The precision is poor using RTT due to the involvement of an unknown processing time/time delay in a node after first receiving a message signal from a second node before the signal is sent back to the second node. The processing time is non-deterministic and varies between different devices in a wireless network. Furthermore, such processing times can vary within specific devices due to the work load of the processor.

One solution to the problem of determining an accurate distance between nodes in a wireless communication network would be to exclude the processing time by measuring only the Time of Flight between two nodes. However, this requires that the same time base is used at both nodes, which presents a similar problem as the one described for RTT. Achieving a mutual time base in different nodes requires synchronization between said nodes. Such synchronization is, in a similar way as when measuring RTT, affected by processing times. Thereby, the original problem is recreated.

With the above solutions in mind it would be advantageous to provide a wireless communication network distance determination system that would allow for more accurate distance determinations.

SUMMARY OF INVENTION

An object of the present solution is to provide a system to be used in a wireless communication network, such as IEEE 802.11x, which provides means for more accurate distance determination between nodes. Another object of the present solution is to provide sound means in order to further enhance the accuracy of a system determining the distance between two nodes in a wireless communication network.

Thus the solution relates to a method in a first node for determining the distance between said first node and a second node in a wireless communication network, wherein said first node comprises a network communication unit with a medium access control layer (MAC-Layer), and the first node performs a method comprising:
transmitting a response request message,
starting a first counter at transmission of said response request message,
receiving a response to said response request message,
stopping the counter at reception of the response to said response request message,
determining based on the counter result the distance between said first and second node,
wherein
said counter result is the period from transmission of said response request message to the arrival of said response in the medium access control layer (MAC-Layer) of said first node network communication unit.

According to one aspect, a method is provided wherein, the first node is a cell phone, preferably a smart phone, handheld computer, PDA, tablet, computer, or any other device that an end user can interact with. The second node is a tag, cell phone, handheld computer, PDA, tablet, general purpose computer, or any other device capable of communicating over a wireless communication network. The device comprises at least one network communication unit each which enables the device to connect to a wireless communication network. Such network communication unit can in one embodiment be a network card, wireless LAN chip, Bluetooth chip, or any other unit that enables network communication.

It is further understood that network communication between nodes is not limited to peer-to-peer networks and can be any form of network communication, comprising other network communication units such as for example access points.

The counter can in one embodiment count processor cycles based on for example a central processing unit clock frequency. It is further understood that the counter can be any means arranged in a node, or attached hardware or software, which can directly or indirectly be used to determine a passed time.

According to one aspect of the present solution, a method is provided wherein a first node for determining the distance between two nodes in a communication network utilizes the media access control layer (MAC-layer) present in multiple standards, such as the IEEE 802.11x standard.

The MAC-layer is a low level data link sub-layer which makes it possible for several nodes in a communication network to communicate. The low level layers have the benefit that they are less affected of processing times than the high level layers.

It has been shown that network communication conducted within the MAC-layer without the involvement of higher level layers provide processing times that are relatively constant. The MAC-layer is adapted communicate the information of high level layers as one of its tasks but some frames can be transmitted standalone by the MAC-layer. By utilizing those frames, and/or, modifying behavior of a MAC-layer in a wireless communication network by adding additional features, processing times can be changed from an unreliable and changeable time factor to an approximated constant. The possibility to approximate the processing time makes it possible to subtract the processing time and utilize Time of Arrival/Time of Flight measurements. The aforementioned method thereby provides an enhanced system for determining the distance between two nodes in a communication network by significantly reduce the problem of previous RTT methods.

According to one aspect, a method is provided wherein said response request message is a Request-To-Send (RTS) message and said response is a Clear-To-Send (CTS) message.

RTS and CTS is a method to implement collision avoidance in for example a Carrier sense multiple access with collision avoidance (CSMA/CA) system. The method is built in to the IEEE 802.11x standard but it is optional to use the function. Thereby, not all messages sent over Wi-Fi are preceded with a RTS/CTS requests. The method of RTS and CTS is aimed of solving the problem of hidden nodes in a wireless communication network by implementing that a node prior to transmitting data sends a Request-To-Send message to the receiving node. The receiving node response with a Clear-To-Send message that all nodes in the network notices and thereby knows that data will be sent. Collisions can thereby be avoided.

RTS and CTS messages are handled in the MAC-layer of a network communication unit structure and thereby have the advantage of relatively stable processing times. This applies not only between different version of the same node but also between different sorts of nodes, such as mobile phones, access points, Wi-Fi-tags, etc. Furthermore, RTS and CTS messages are a part of some wireless network communication standards and is thereby always present in devices following those standards.

In a further aspect of the present solution, a method is provided wherein, said first node comprises sound means to receive and transmit acoustic or digital sound signals, wherein after determining the distance between said first and second nodes, said first node performs a method comprising:
transmitting a first acoustic or digital sound signal,
starting a counter at transmission of the acoustic or digital sound signal,
receiving a second acoustic or digital sound signal,
stopping the counter at reception of the second acoustic or digital sound signal,
determining based on the counter result the distance between said first and second node.

To further enhance the accuracy of a distance determination system, sound means can be used as a complement to the Time of Flight/Time of Arrival of wireless data messages. Sound means can for example consist of a listening device, such as a microphone or pickup, and a transmitter, such as one or more speakers. It is further understood that sound means can be any other devices capable of sending or receiving of sound, or a combination thereof.

In one embodiment the sound means are adapted to transmit and/or receive sounds that are not in the normal hearing range of a human.

According to one aspect, at least one of said acoustic or digital sound signals utilizes chirp.

According to one aspect, a method is provided wherein the distance between a first and second node in a wireless communication network is first determined with means of a request response message and a corresponding response as previously described.

To further enhance the accuracy of the distance and help identify the exact location of one of the nodes sound means can be used. The sound means work for close range distance determination where wireless communication is less accurate.

According to one aspect, a method is provided wherein said first node comprises sound means to receive and transmit acoustic or digital sound signals, wherein after determining the distance between said first and second nodes, said first node performs a method comprising:
transmitting a first acoustic or digital sound signal,
starting a counter at transmission of the acoustic or digital sound signal,
receiving a second acoustic or digital sound signal,
stopping the counter at reception of the second acoustic or digital sound signal,
receiving a determined processing time ($T_Y$) over said wireless communication network,
determining the average Time of Flight=$(T_X-T_Y)/2$, and
determining based on the average Time of Flight the distance between said first and second node.

According to one aspect, a method is provided that provides better accuracy of determining the distance between a first and second node with the means of wireless network communication in combination with sound means. After determining the distance between said first and second node as previously described, a more accurate distance determination can be performed with means of an average Time of Flight for an acoustic or digital sound signal. The average Time of Flight of an acoustic or digital sound signal can in such an embodiment be determined through measuring the Time of Flight in two directions and utilize the wireless network communication system to communicate the counted time. The calculation of average Time of Flight can be performed in either one of said first and second node, or both. However, in one preferred embodiment, a first counter is located in a first node and arranged to count the time between the start of a first transmission and the end of a responding reception. Said first counter can be a general digital logic or computing counter that stores the number of times a particular event has occurred. Such events can for example be clock cycles, passed time, or any other means that can be used to determine the amount of time passed. A second counter similar to said first counter but located in a second node can in a further embodiment be arranged to calculate a time between start of reception of a first signal and the end of transmission of a response to said first signal.

According to one aspect, a method is provided in a first node for determining the distance between said first node and a second node in a wireless communication network wherein, the additional method is performed comprising:
collecting multiple determined distances,
using the multiple determined distances to determine an average error,
using the average error to determine the distance between said first and second nodes.

The average error can be estimated by conducting multiple distance determinations. Thereby, can the accuracy of the distance determination system be improved and provide more exact distance determinations.

In yet another aspect of the solution, a method is provided wherein, said first node prior to transmitting said first acoustic or digital sound signal performs the method of:
transmitting, over said wireless communication network, a request to start transmitting and receiving acoustic or digital sound signals, and
receiving, over said wireless communication network, a confirmation to start transmitting and receiving acoustic or digital sound signals.

According to one aspect, a method is provided wherein a request to start transmitting and receiving acoustic or digital sound signals is sent prior to transmission of the acoustic or digital sound signal used for determining the distance between a first and second node. Said request enables for acoustic or digital sound signals from both the first and second node to be transmitted during the same time frame. I.e. an acoustic response from said second node can be transmitted before the request has been received since the second node already from the request to start transmit and receive knows that a request is inbound.

In another aspect of the solution, a method is provided wherein, a second wireless communication network is used to wake said first wireless communication network.

Different wireless communication networks have different features that are beneficial for certain purposes. For example, a long range network might in one embodiment be more power consuming than a short range network. The same thing applies for different standards where different network types comprise advantages suitable for their designed purpose.

In one aspect a node within a wireless communication network comprises a second network communication unit suitable for a different standard than said first network communication unit. The second network communication unit is used to monitor for activation signals and is only used to activate the first network communication unit in the case when a distance determination need to be performed. Thereby, it is possible for a wireless network communication with features suitable for awaiting an activation signal to be used during most of the standby time while the wireless network communication suitable for distance measurement, in such an aspect, may be active only during the distance determination process.

In one aspect, the first wireless communication network, and thereby the first network communication unit, is arranged to use the IEEE 802.11x/Wi-Fi standard for distance determination and the second wireless communication network, and thereby the second network communication unit, arranged to use Bluetooth.

According to one aspect, a method is provided wherein, in a second node for enabling a first node to determining the distance between said first and second nodes in a wireless communication network, said second node comprises a network communication unit with a medium access control layer (MAC-Layer), and
the second node performs a method comprising:
receiving a response request message from said first node,
transmitting a response to said response request message,
wherein
the aforementioned method is performed instantly in the medium access control layer (MAC-Layer) of said second node network communication unit.

According to one aspect, a method is provided, wherein said response request message is a Request-To-Send (RTS) message and said response is a Clear-To-Send (CTS) message.

According to one aspect, a method is provided wherein, said second node comprises sound means to receive and transmit acoustic or digital sound signals, wherein, said second node performs a method comprising:
receiving a first acoustic or digital sound signal, and
transmitting a second acoustic or digital sound signal.

According to one aspect, a method is provided wherein, said second node comprises sound means to receive and transmit acoustic or digital sound signals, wherein after performing the method of claim 6, said second node performs a method comprising:
receiving a first acoustic or digital sound signal,
starting a second counter at receipt of said first acoustic or digital sound signal,
transmitting a second acoustic or digital sound signal,
stopping the counter at transmission of said second acoustic or digital sound signal,
transmitting the counter result over said wireless communication network.

According to one aspect, a method is provided wherein said second node prior to receiving said first acoustic or digital sound signal performs method of:
receiving, over said wireless communication network, a request to start transmitting and receive acoustic or digital sound signals, and
transmitting, over said wireless communication network, a confirmation to start transmitting and receiving acoustic or digital sound signals.

One embodiment of the present solution comprises a node for enabling determination of the distance between a first and second node in a wireless communication network, such as IEEE 802.11x, wherein said first node comprises a network communication unit with a medium access layer (MAC-Layer), and said first node comprises;
means for transmitting a response request message,
a counter to count time between said response request message and a response,
means for receiving a response to said response request message,
means of determining, based on the counter result, the distance between said first and second node,
wherein
said counter result is the period from transmission of said response request message to the arrival of said response in the medium access control layer (MAC-Layer) of said first node network communication unit.

In one embodiment of the node for enabling determination of the distance between a first and second node in a wireless communication network, said response request message is a Request-To-Send (RTS) message and said response is a Clear-To-Send (CTS) message.

In yet another embodiment of the node for enabling determination of the distance between a first and second node in a wireless communication network, said node comprise sound means to receive and transmit acoustic or digital sound signals, and said node is adopted to:
transmit a first acoustic or digital sound signal,
start a counter at transmission of the acoustic or digital sound signal,
receive a second acoustic or digital sound signal,
stop the counter at reception of the second acoustic or digital sound signal,
determine based on the counter result the distance between said first and second node.

In another embodiment a node for enabling determination of the distance between a first and second node in a wireless communication network is arranged wherein said node comprise sound means to receive and transmit acoustic or digital sound signals, and said node is adopted to:
transmit a first acoustic or digital sound signal,
start a counter at transmission of the acoustic or digital sound signal,
receive a second acoustic or digital sound signal,
stop the counter at reception of the second acoustic or digital sound signal,
receive a determined processing time over said wireless communication network,
determine the average Time of Flight=(TX−TY)/2, and
determine based on the average Time of Flight the distance between said first and second node.

In another embodiment, a node in a wireless communication network, comprises a network communication unit with a medium access control layer (MAC-Layer), said node configured to calculate the Time of Arrival and/or Time of Flight based on a counted time from transmission of a response request message in the medium access control layer of said node to the corresponding arrival of a response to said response request message in the medium access control layer (MAC-Layer) of said node.

In another embodiment for said node, said response request message is a Request-To-Send (RTS) message and said response is a Clear-To-Send (CTS) message.

In another embodiment in a wireless communication network, said node further comprises sound means to receive and transmit acoustic or digital sound signals for close range positioning, wherein said node is configured to calculate the Time of Arrival and/or Time of Flight of an acoustic or digital sound signal.

In yet another embodiment of a node in a wireless communication network said node is adopted to:
transmit a first acoustic or digital sound signal,
start a counter at transmission of the acoustic or digital sound signal,
receive a second acoustic or digital sound signal,
stop the counter at reception of the second acoustic or digital sound signal,
receive a determined processing time over said wireless communication network,
determine the average Time of Flight=(TX−TY)/2, and
determine based on the average Time of Flight the distance between said first and second node.

In one embodiment, a computer program, comprising computer readable code means, which when ran in a node in a wireless communication network, causes the node to perform any of the aforementioned corresponding methods.

In one embodiment, a computer program product, comprising computer readable medium and a computer program, wherein the computer program, is stored on the computer readable medium.

In one further embodiment of the present solution a node in a wireless communication network comprises an additional clock or counter, wherein said additional clock or counter has a clock frequency of 30-300 MHz, preferably 40 MHz.

BRIEF DESCRIPTION OF DRAWINGS

The solution is now described, by way of example, with reference to the accompanying drawings, in which.

DESCRIPTION OF EMBODIMENTS

In the following, a detailed description of the different embodiments of the solution is disclosed under reference to the accompanying drawings. All examples herein should be seen as part of the general description and are therefore possible to combine in any way in general terms. Individual features of the various embodiments and methods may be combined or exchanged unless such combination or exchange is clearly contradictory to the overall function.

Figure 1:
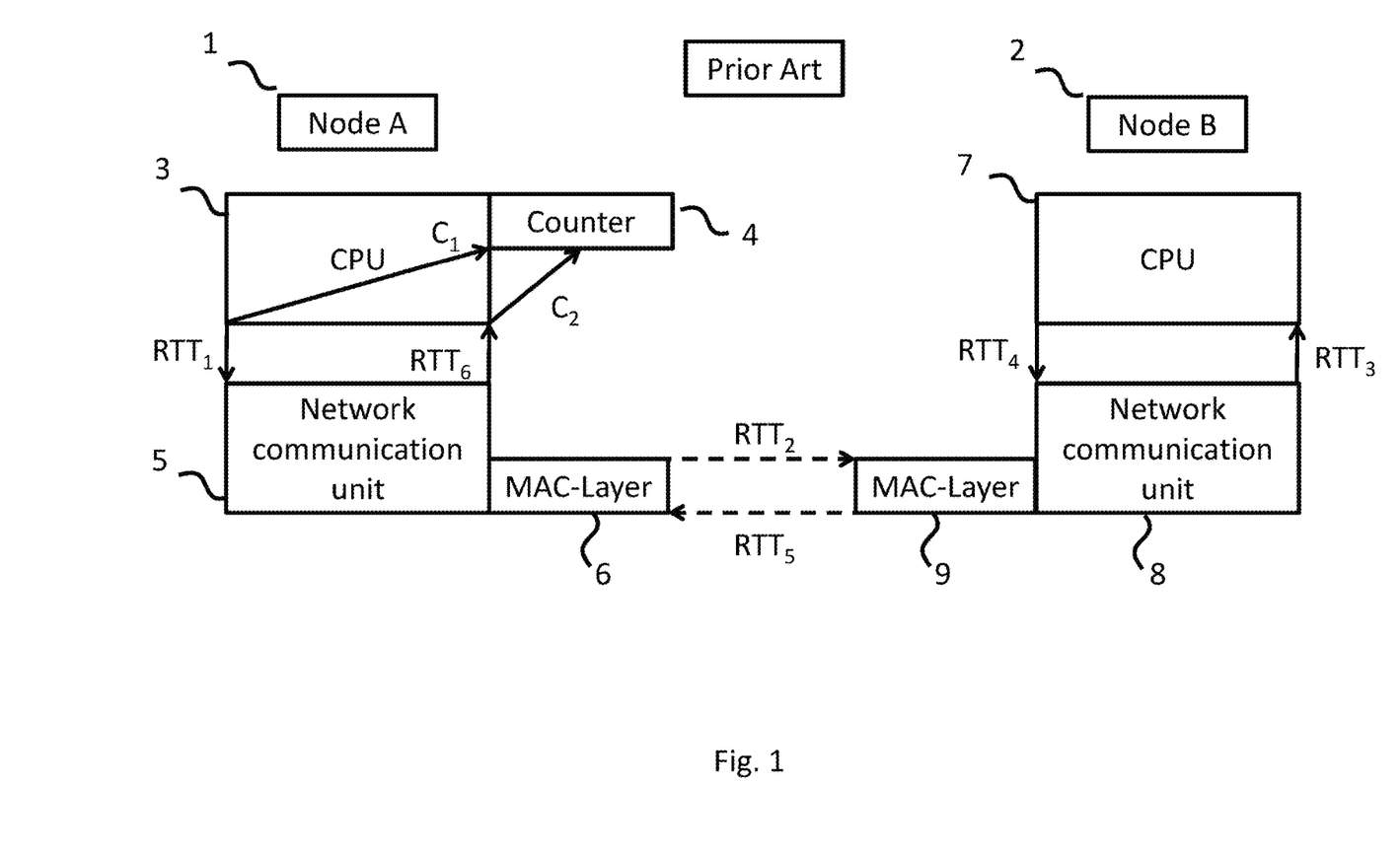
FIG. 1 illustrates RTT as known in the prior art.

In FIG. 1 an illustration of round trip time (RTT) as known by the prior art is shown. Each node 1, 2, comprise a central processing unit (CPU) 3, 7, a network communication unit (NCU) 5, 8 and one media access layer (MAC-Layer) 6, 9 each. The first node 1 further comprises a counter 4. A RTT message $RTT_n$ is shown in different stages of transmission $RTT_1$, $RTT_2$, $RTT_3$, $RTT_4$, $RTT_5$, $RTT_6$ illustrating the path a RTT message travels. FIG. 1 further shows a simplified sketch of a first node 1, also indicated as "Node A" and second node 2, also indicated as "Node B", wherein said first node 1 comprise a CPU 3 with a first counter 4 and a NCU 5 with a MAC-Layer 6. The second node 2 comprises a CPU 7 and a NCU 8 with a MAC-Layer 9.

FIG. 1 further illustrates how to determine the distance between a first node 1 and a second node 2 in a wireless communication network with RTT. A RTT message $RTT_n$ is sent from the CPU 3 of the first node 1 and the counter 4 is started with a start signal $C_1$ at the first transmission step $RTT_1$. The transmission passes the NCU 5 and the MAC-Layer 6 of said first node 1 in the second transmission step $RTT_2$ and reaches the MAC-layer 9 of said second node 2. The MAC-layer 9 is a part of the NCU 8 and the transmission is further passed on to the CPU 7 of said second node 2 in transmission step $RTT_3$. The CPU 7 processes the transmission and creates a response which is transferred back to the NCU 8 through the fourth transmission step $RTT_4$. The transmission is further passed on through the MAC-Layer 9 of the second node 2 and transferred back to the MAC-Layer 6 of said first node 1 through the fifth transmission step $RTT_5$. Finally the transmission reaches the CPU 3 of said first node 1 through transmission step six $RTT_6$ and the counter 4 is stopped through a stop signal $C_2$.

In additional to processing times the accuracy of positioning systems in network communication systems, such as Wi-Fi, presents additional problems. The Wi-Fi standard is developed for network communication and is not by default adapted for positioning systems or distance determination. The Wi-Fi standard for example comprises a timer with a clock frequency of 1 MHz, a resolution allowing for time determination in terms of micro seconds. The ability to determine a position or distance is directly related to the resolution of which time can be measured in a RTT system. The resolution of micro seconds thereby makes those systems undesirably inaccurate.

Figure 2:
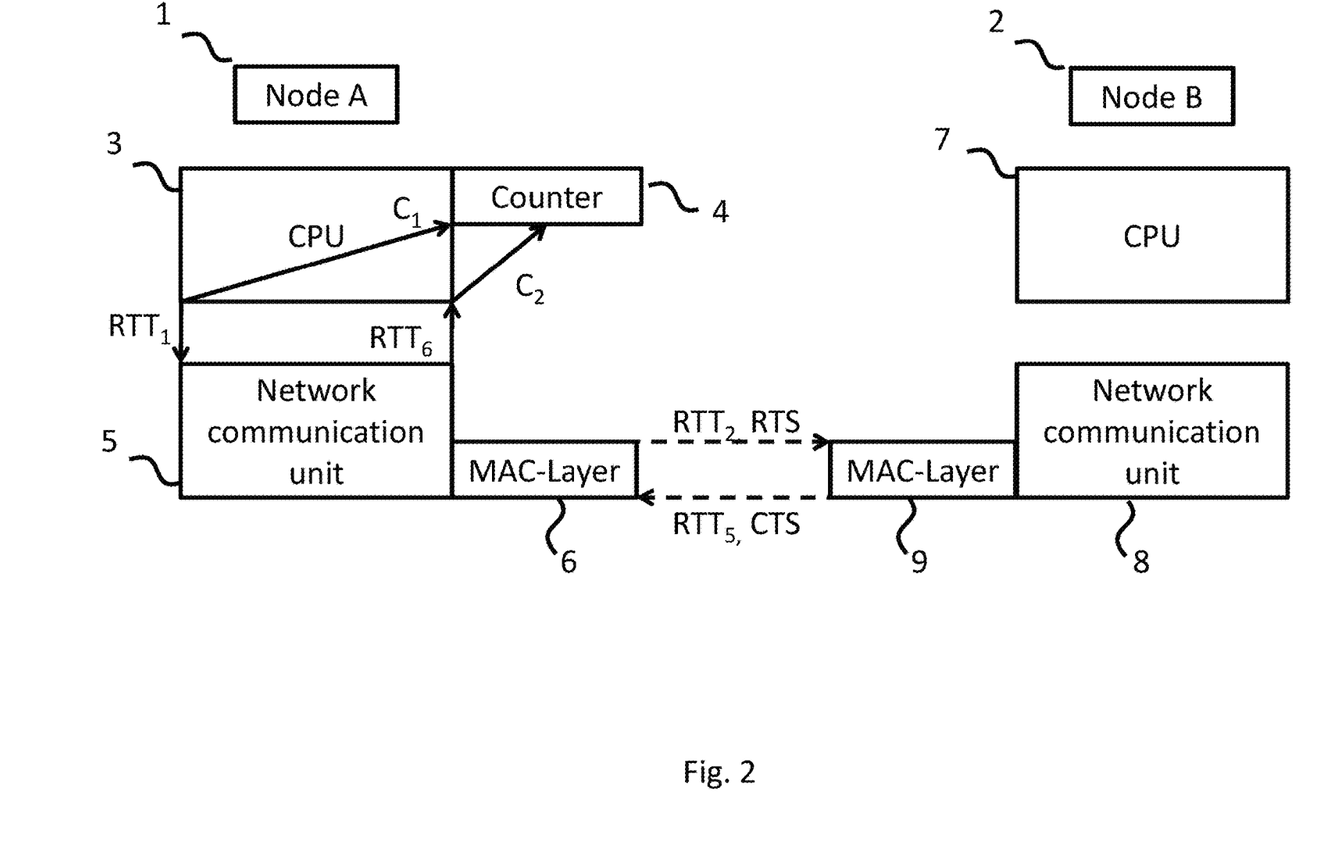
FIG. 2 illustrates the solution with Time of Flight/Time of Arrival.

FIG. 2 illustrates a first embodiment of the solution wherein the transmission for determining the distance between a first node 1, also indicated as "Node A", and a second node 2, also indicated as "Node B", utilizes Time of Arrival/Time of Flight instead of round trip time. FIG. 2 also illustrates how the transmission used to determine the distance between said first node 1 and said second node 2 is handled in the Mac-Layers 6, 9 of the nodes 1, 2. A response request message $RTT_n$, is transmitted from the CPU 3 of the first node 1 and the counter is started with a start signal $C_1$. The response request message is further transferred through the NCU (Network Communication Unit) 5 and the MAC-Layer 6 and finally transmitted to the second node 2. An example of a NCU is a PHY-type of chip, not limiting to other types of components. The NCU and the MAC may be integrated or collocated into the same physical component. The NCU may in different embodiments comprise various functions or components, such as radio frequency functions, signal mixing functions, transceiver functions, digital baseband functions, digital signal processing functions, communication algorithm functions, not limiting to other functions or physical components. The second node 2 handles the response request message $RTT_n$ and returns the reply $RTT_S$ directly in the MAC-Layer 9 eliminating any steps involving the CPU 7 of the second node 2. The response is transferred to the CPU 3 of the first node 1 and the counter 4 is stopped by the stop signal $C_2$. Thereby, any unknown processing time in the second node 2 can be eliminated. This can further be improved with the use of RTS and CTS messages in standards supporting such messages. For example, in IEEE 802.11x, the MAC-Layers 6, 9 supports RTS and CTS messages that are sent prior to any data transmission. This is further illustrated in FIG. 5.

Figure 3:
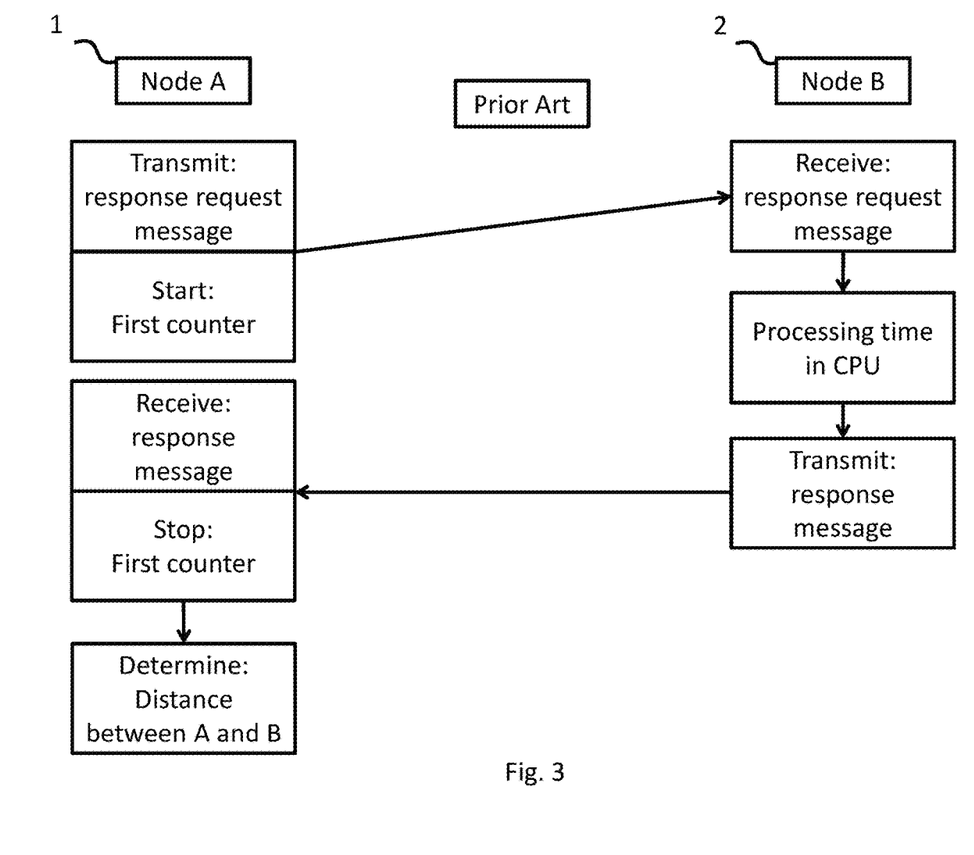
FIG. 3 illustrates a schematic drawing of the prior art.

FIG. 3 illustrates a schematic drawing of the prior art showing how a response request message is handled in the illustrated embodiment of FIG. 1.

Figure 4:
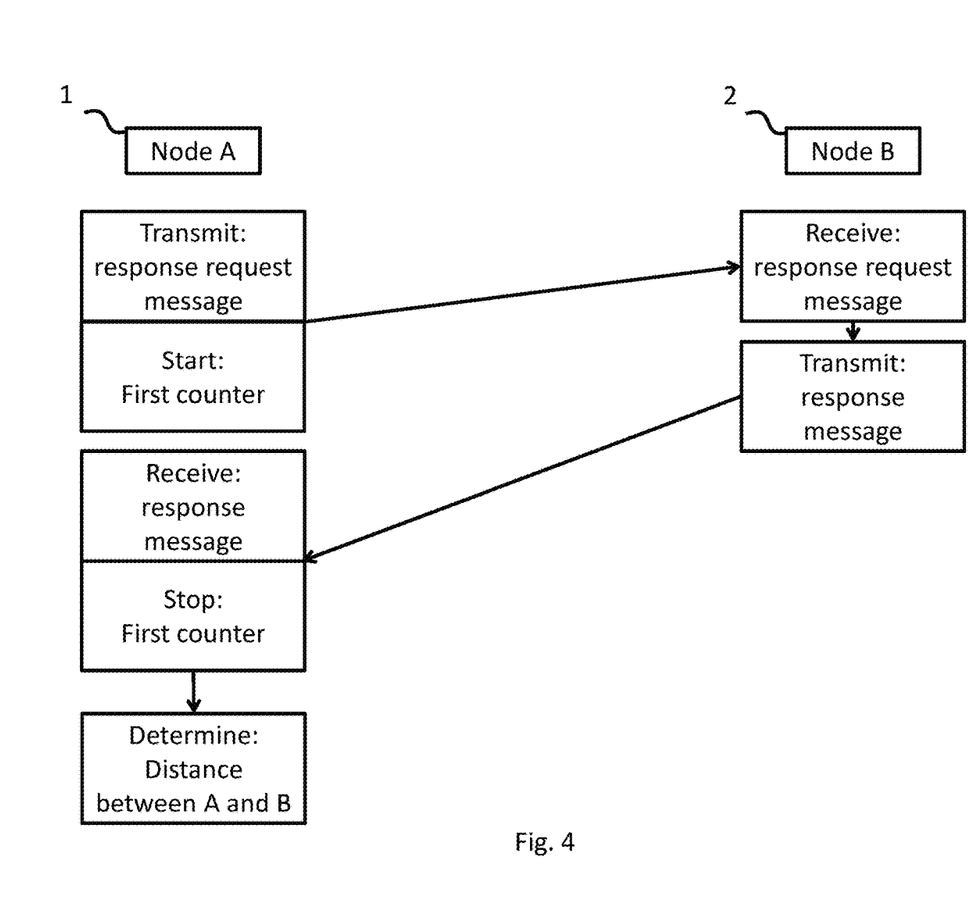
FIG. 4 illustrates a schematic drawing of the solution.

FIG. 4 illustrates a schematic drawing of present solution where the processing time in the CPU of FIG. 3 may be limited or eliminated in accordance with an embodiment of the present solution.

Figure 5:
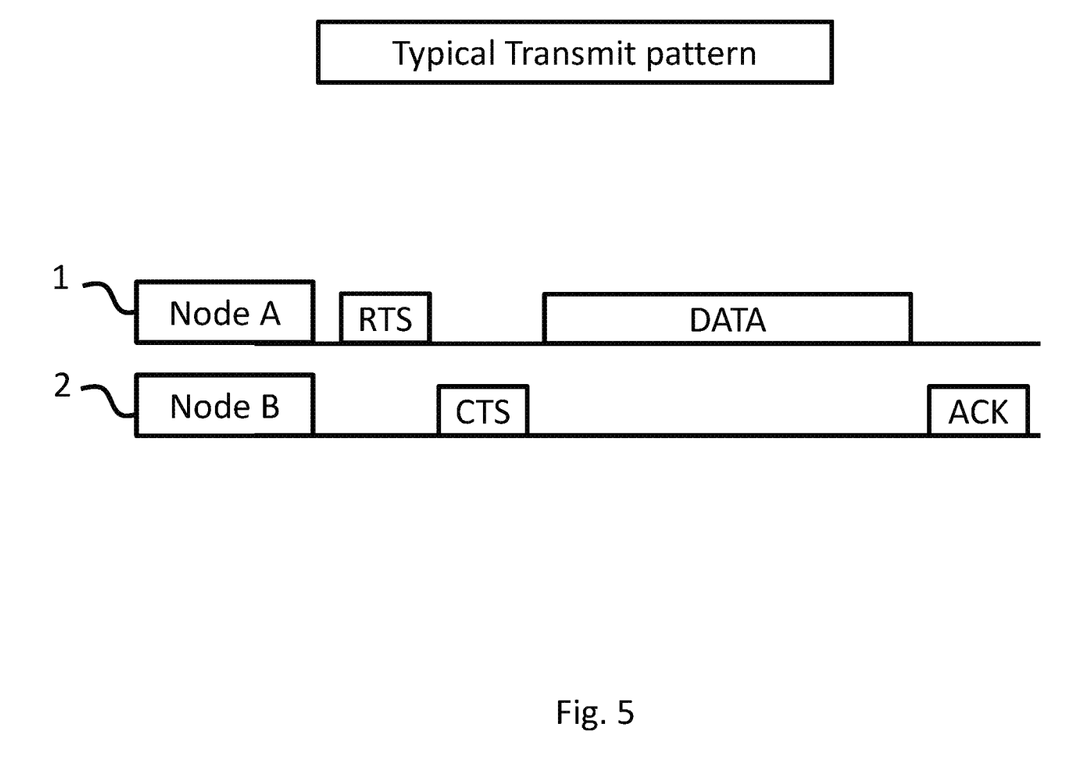
FIG. 5 illustrates a typical transmit pattern for nodes in a wireless communication network.

FIG. 5 illustrates a transmit pattern for wireless communication networks, such as for IEEE 802.11x, wherein a first node 1 transmit a Request-to-Send message (RTS) and a second node 2 response with a Clear-to-Send messages (CTS) before any data is transferred. The RTS and CTS messages may be handled in the MAC-Layers of both the first node 1 and the second node 2 and may be thereby not affected of processing times in the CPUs of the nodes 1, 2.

Figure 6:
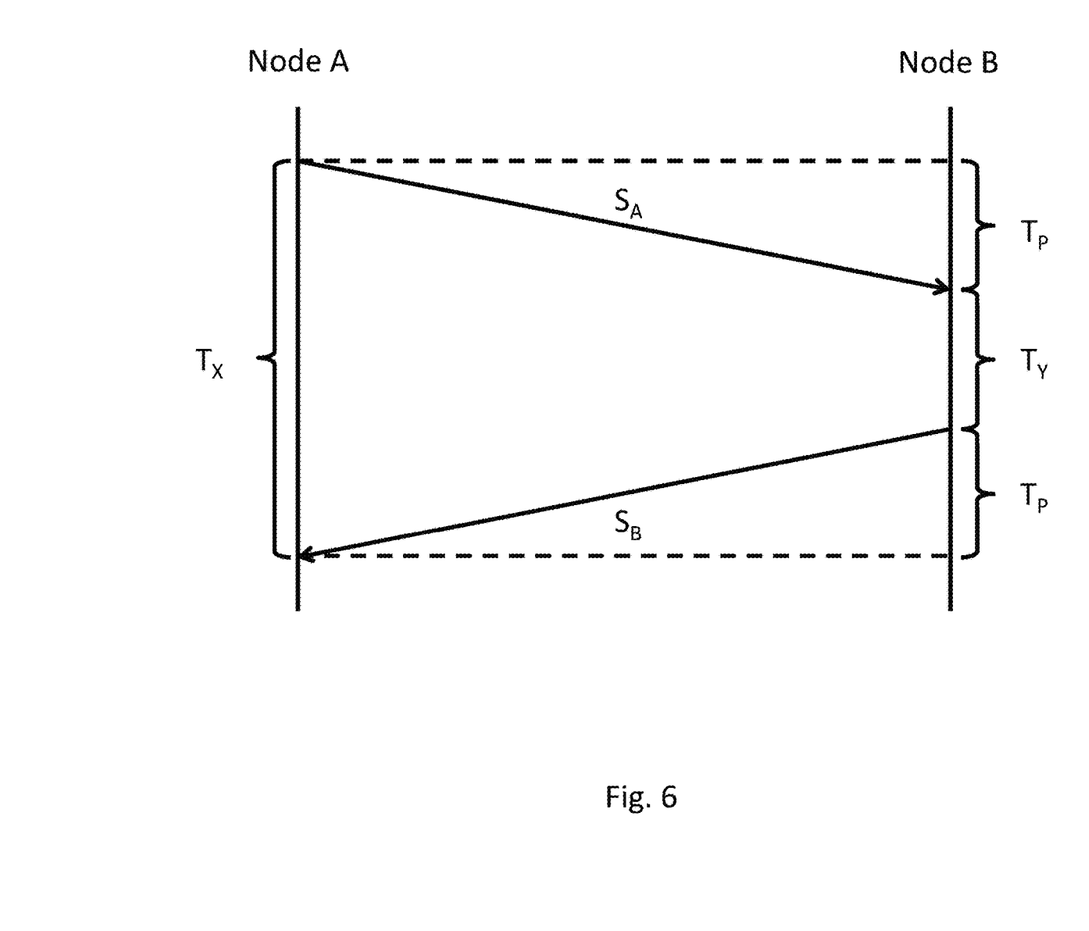
FIG. 6 illustrates a method for Time of Flight/Time of Arrival determination.

FIG. 6 illustrates a method of determining the distance between a first and second node. The first node 1 may transmit a first acoustic or digital sound signal $S_A$ and at transmission of the acoustic or digital sound signal $S_A$ starts a counter $T_X$ adapted to measure the Time of Flight of an acoustic or digital sound signal. The acoustic or digital sound signal $S_A$ may be received by the second node 2 and a second counter $T_Y$ adapted to count the time between receipt of said first signal $S_A$ and transmission of a response signal $S_B$ starts. The second node 2 may transmit a response signal $S_B$ and the counter $T_Y$ is stopped. The first node receives the response signal $S_B$ and stops the counter $T_X$. The Time of Flight is thereafter determined by subtracting the two times determined by the counters and thereby determining the average Time of Flight indicated by $(T_X - T_Y)/2$.

In an embodiment the determination of Time of Flight may be designated to one of the nodes. For example, in an embodiment the Time of Flight may be determined by the first node 1 after reception of a determined processing time $T_Y$ which corresponds to the value of the counter $T_Y$ of the second node 2.

Figure 7:
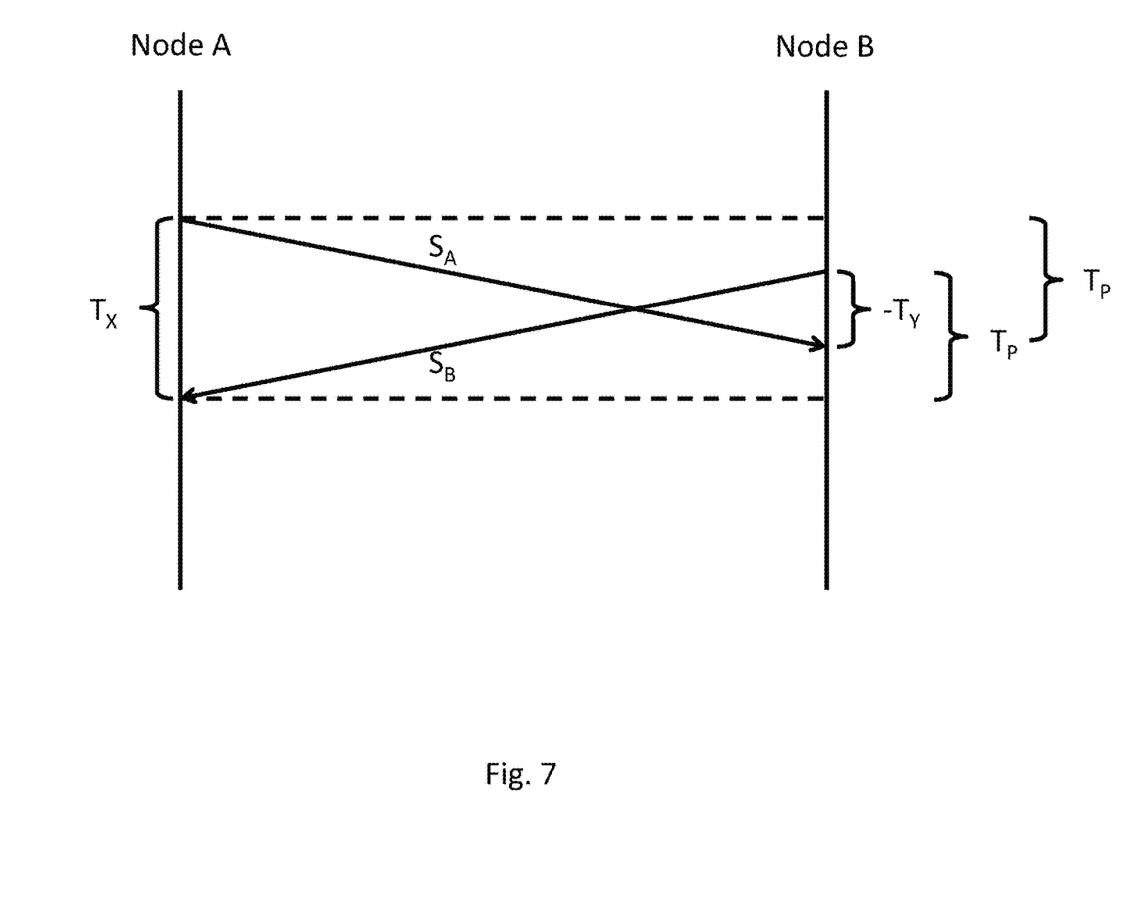
FIG. 7 illustrates an alternative aspect of a method for Time of Flight/Time of Arrival determination.

FIG. 7 illustrates another embodiment of the present solution wherein a first node 1 and a second node 2 may communicate prior to transmission of any acoustic or digital sound signals and may create a handshake wherein both nodes 1, 2 are aware of an inbound acoustic or digital sound signal. By means of such a handshake action the total transmission time counted by the counter $T_X$ of the first node may be decreased while the average time of flight $T_F$ still can be determined. In an embodiment the determined processing time $T_Y$ counted by the second node could thereby be negative.

The handshake is in an embodiment conducted over a wireless communication network.

Figure 8:
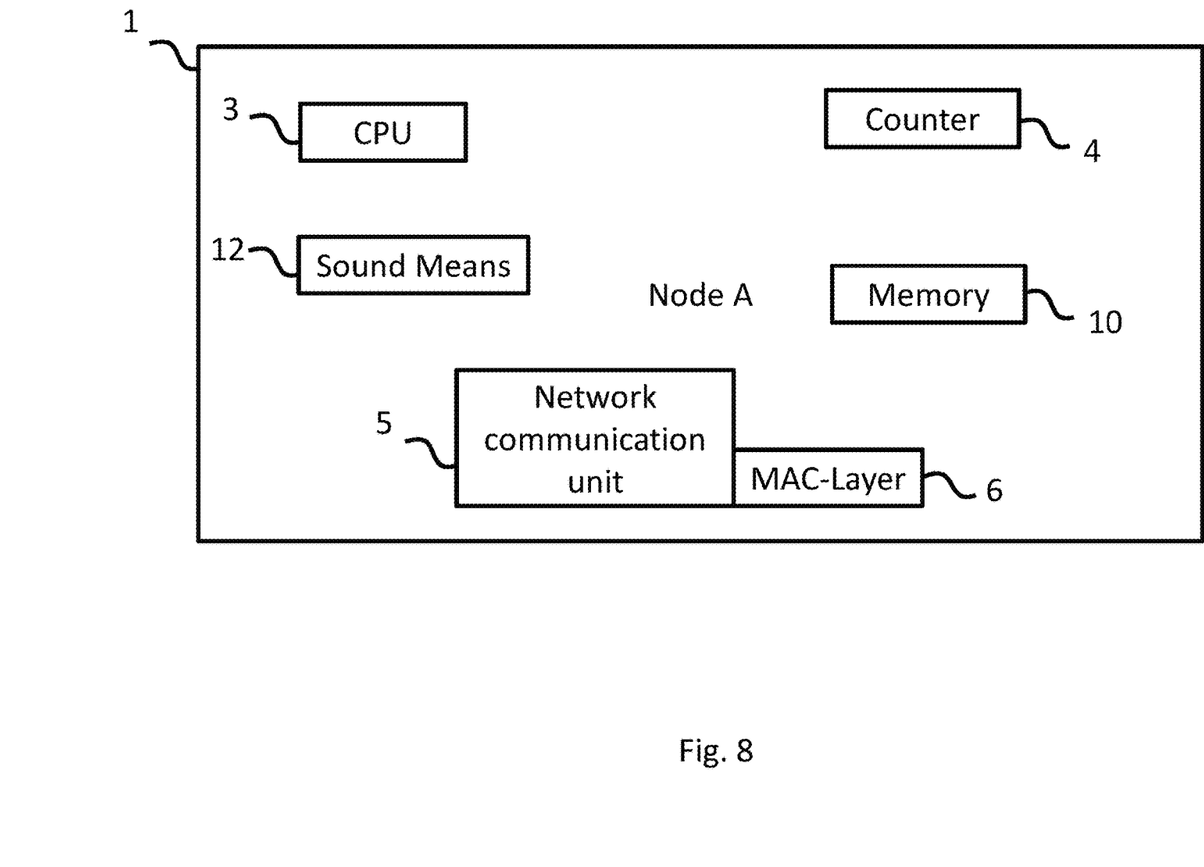
FIG. 8 illustrates a first node, "Node A".

FIG. 8 illustrates a first node 1, also called "Node A", comprising a central processing unit 3 (CPU), a counter 4, a memory or computer readable medium 10, a network communication unit 5 (NCU) comprising a media access layer 6 (MAC-Layer), and sound means 12, 13.

Figure 9:
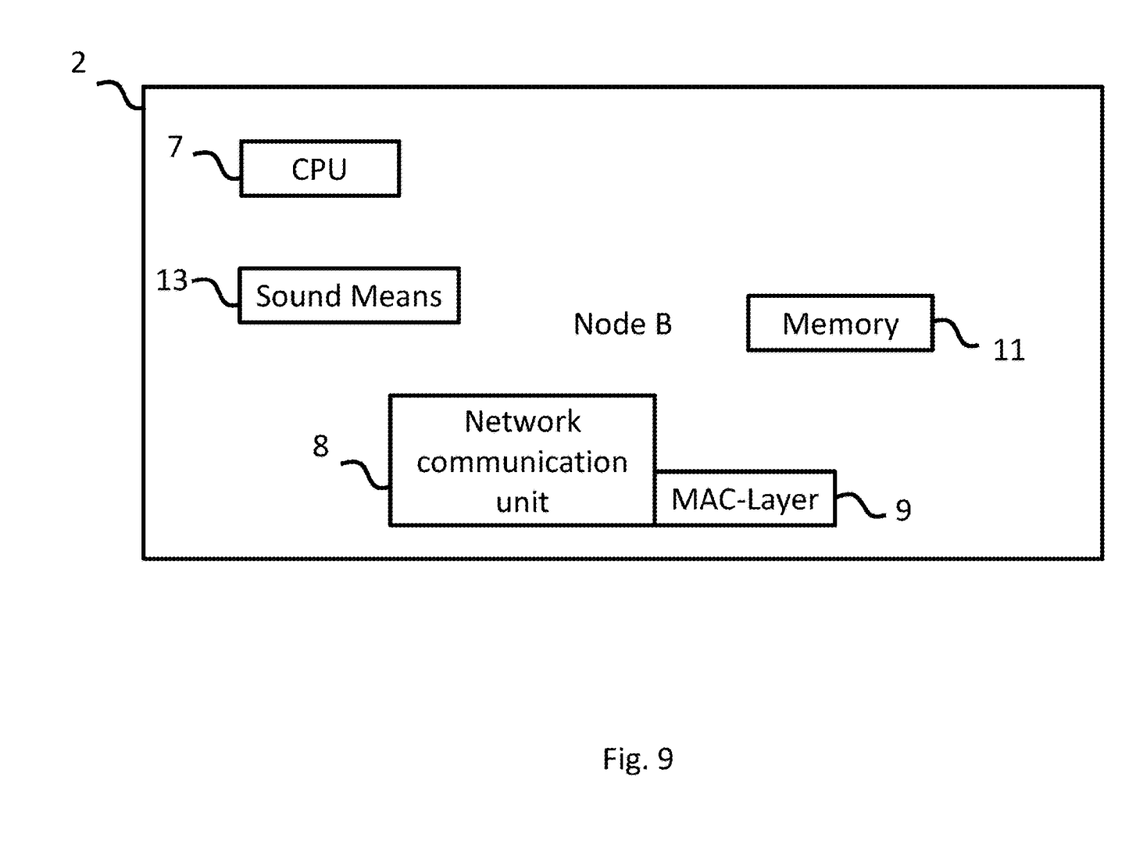
FIG. 9 illustrates a second node, "Node B".

FIG. 9 illustrates a second node 2, also called "Node B", comprising a central processing unit 7 (CPU), a memory or computer readable medium 11, a network communication unit 8 (NCU) comprising a media access layer 9 (MAC-Layer), and sound means 12, 13.

Figure 10:
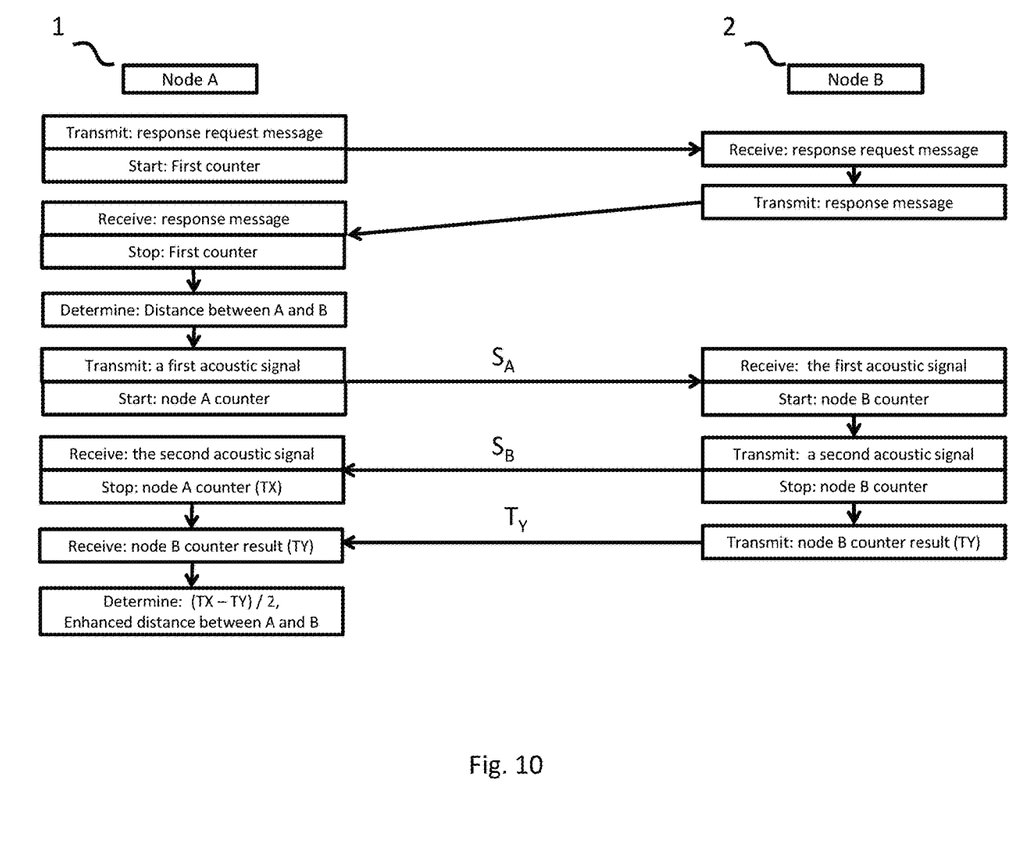
FIG. 10 illustrates a schematic drawing of an enhanced distance determining system using both wireless communication and sound means for determining distance between two nodes.

FIG. 10 illustrates a schematic drawing of an enhanced distance determining system using both wireless communication and acoustic or digital sound means 12, 13 for determining the distance between two nodes. Determination of distance with the use of wireless communication networks has an accuracy which is not always adequate for the desired application area. In order to further enhance the precision of such systems additional means, such acoustic or digital sound means 12, 13 can be added in one embodiment of the present solution.

In an embodiment of the present solution the distance between two nodes may be first determined with means of Time of Arrival/Time of Flight over the wireless communication network. As a second step the distance determination may be improved by usage of a sound in order to determine a close range distance. The wireless technology may be a complement to the sound distance determination technology due to their different characteristics, for example such as range accuracy. Furthermore, the wireless communication network can further be utilized in combination with said sound distance determination technology by transmitting information, such as counted Time of Flight for the sound, between the two nodes over the wireless communication network.

In an embodiment of the present solution an additional clock may be added to at least one node in a wireless communication network that uses a higher clock frequency than the standard clock. For example, in an IEEE 802.11x wireless communication network system the 1 MHz clock frequency may be complemented with an additional clock that provides better resolution for distance determination. In a preferred embodiment is such a complementary clock arranged with a frequency at 30-50 MHz, 30-300 MHz, 100 MHz or higher, or approximately 40 MHz.

An advantage with higher frequencies, such as for example 30-300 MHz is that it is possible to in the lower range reach distance accuracy down to meters and in the higher range accuracy down to centimeters which is a significant improvement over previously known art.

In one additional embodiment of the present solution the increasing or decreasing frequency of a chirp signal can be used as a part of the distance determination method and device.

It should be noted that in the detailed description above any embodiment, aspect, or feature of an embodiment are only examples and could be combined in any way if such combination is not clearly contradictory.

I claim:

1. Method in a system comprising a first node for determining the distance between said first node and a second node in a wireless communication network, wherein said first and second node comprises a network communication unit each with a data link sub-layer, and the method comprising:
   the first node transmitting a response request message,
   the first node starting a first counter at transmission of said response request message,
   in the second node receiving a response request message from said first node,
   transmitting a response to said response request message instantly in the data link sub-layer of said second node network communication unit, in the first node receiving a response to said response request message, in the first node stopping the first counter at reception of the response to said response request message, in the first node determining based on the counter result of the first counter the distance between said first and second node, wherein the counter result from the first counter is the period from transmission of said response request message to the arrival of said response in the data link sub-layer of said first node network communication unit, and wherein the accuracy of said distance is further enhanced by the steps:

receiving a first acoustic or digital signal in the second node, starting a second counter at receipt of said first acoustic or digital signal, transmitting a response to the first acoustic or digital signal from the second node, stopping the second counter at transmission of said response to the first acoustic or digital signal, transmitting the counter result from the second counter over said wireless communication network to said first node.

2. The method according to claim 1 wherein said response request message is a Request-To-Send (RTS) message and said response is a Clear-To-Send (CTS) message.

3. The method according to claim 1 wherein, said first node comprises sound means to receive and transmit acoustic sound signals, wherein after determining the distance between said first and second nodes, said first node performs a method comprising:

transmitting a first acoustic sound signal (SA), starting a counter (TX) at transmission of the acoustic sound signal (SA), receiving a second acoustic sound signal (SB), stopping the counter (TX) at reception of the second acoustic sound signal (SB), determining based on the counter result (TX) the distance between said first and second node.

4. The method according to claim 1 wherein, said first node comprises sound means to receive and transmit acoustic sound signals, wherein after determining the distance between said first and second nodes, said first node performs a method comprising:

transmitting a first acoustic sound signal (SA), starting a counter (TX) at transmission of the acoustic signal (SA), receiving a second acoustic sound signal (SB), stopping the counter (TX) at reception of the second acoustic sound signal (SB), receiving a determined processing time (TY) over said wireless communication network, determining the average Time of Flight=(TX−TY)/2, and determining based on the average Time of Flight the distance between said first and second node.

5. The method according to claim 3 wherein said first node prior to transmitting said first acoustic sound signal performs the method of:

transmitting, over said wireless communication network, a request to start transmitting and receiving acoustic sound signals, and receiving, over said wireless communication network, a confirmation to start transmitting and receiving acoustic sound signals.

6. The method according to claim 3 wherein, at least one of said acoustic sound signals utilizes chirp.

7. The method in the first node for determining the distance between said first and second nodes in a wireless communication network wherein, the method according to claim 1 is performed more than once and said first node performs the additional method of:

collecting multiple determined distances, using the multiple determined distances to determine an average error, using the average error to determine the distance between said first and second nodes.

8. The method according to claim 1 wherein said response request message and said first acoustic or digital signal is part of the same transmission.

9. The method according to claim 1 wherein, said second node comprises sound means to receive and transmit acoustic signals, wherein, said second node performs a method comprising:

receiving a first acoustic sound signal (SA), and transmitting a second acoustic sound signal (SB).

10. The method according to claim 1 wherein, said second node comprises sound means to receive and transmit acoustic signals, wherein after performing the method of claim 1, said second node performs a method comprising:

receiving a first acoustic sound signal (SA), starting a second counter (TY) at receipt of said first acoustic signal (SA), transmitting a second acoustic sound signal (SB), stopping the counter (TY) at transmission of said second acoustic signal (SB), transmitting the counter result (TY) over said wireless communication network.

11. The method according to claim 9 wherein said second node prior to receiving said first acoustic signal performs method of:

receiving, over said wireless communication network, a request to start transmitting and receiving acoustic sound signals, and transmitting, over said wireless communication network, a confirmation to start transmitting and receiving acoustic sound signals.

12. The method according to claim 1 wherein, a second wireless communication network is used to wake said first wireless communication network.

13. Node for enabling determination of the distance between the node and a second node in a wireless communication network, wherein the node comprises a network communication unit with a data link sub-layer and the node comprises;

means for transmitting a response request message, a counter to count time between said response request message and a response, means for receiving a response to said response request message, the response being sent instantly upon reception in a data link sub-layer of the second node, means of determining, based on the counter result, the distance between the node and the second node, wherein the node further is adapted to enhance the accuracy of said distance by receiving a counted processing time from said second node, wherein said counter result is the period from transmission of said response request message to the arrival of said response in the a data link sub-layer of the node network communication unit.

14. The node for enabling determination of the distance between the node and the second node in a wireless communication network according to claim 13 wherein said response request message is a Request-To-Send (RTS) message and said response is a Clear-To-Send (CTS) message.

15. The node for enabling determination of the distance between the node and the second node in a wireless communication network according to claim 13 wherein said node comprise sound means to receive and transmit acoustic sound signals, and said node is adapted to:
   transmit a first acoustic sound signal (SA),
   start a counter (TX) at transmission of the acoustic sound signal (SA),
   receive a second acoustic sound signal (SB),
   stop the counter (TX) at reception of the second acoustic sound signal (SB),
   determine based on the counter result (TX) the distance between said first and second node.

16. The node for enabling determination of the distance between a first and second node in a wireless communication network according to claim 13 wherein said node comprise sound means to receive and transmit acoustic sound signals, and said node is adapted to:
   transmit a first acoustic sound signal (SA),
   start a counter (TX) at transmission of the acoustic sound signal (SA),
   receive a second acoustic sound signal (SB),
   stop the counter (TX) at reception of the second acoustic sound signal (SB),
   receive a determined processing time (TY) over said wireless communication network,
   determine the average Time of Flight=(TX−TY)/2, and
   determine based on the average Time of Flight the distance between the node and the second node.

17. The node in a wireless communication network according to claim 13 comprising an additional clock or counter, wherein said additional clock or counter has a clock frequency of 30-300 MHz.

* * * * *